(12) United States Patent
Chen et al.

(10) Patent No.: US 12,537,075 B2
(45) Date of Patent: Jan. 27, 2026

(54) METHOD AND DEVICE FOR SPECTRAL PREDICTION OF SOIL ORGANIC CARBON BASED ON SPECTRUM-GUIDED ENSEMBLE LEARNING

(71) Applicant: ZJU-HANGZHOU GLOBAL SCIENTIFIC AND TECHNOLOGICAL INNOVATION CENTER, Hangzhou (CN)

(72) Inventors: Songchao Chen, Hangzhou (CN); Jie Xue, Hangzhou (CN); Zhou Shi, Hangzhou (CN); Meihua Yang, Hangzhou (CN)

(73) Assignee: ZJU-HANGZHOU GLOBAL SCIENTIFIC AND TECHNOLOGICAL INNOVATION CENTER, Hangzhou (CN)

( * ) Notice: Subject to any disclaimer, the term of this patent is extended or adjusted under 35 U.S.C. 154(b) by 151 days.

(21) Appl. No.: 18/695,809

(22) PCT Filed: Oct. 17, 2023

(86) PCT No.: PCT/CN2023/124837
§ 371 (c)(1),
(2) Date: Mar. 26, 2024

(87) PCT Pub. No.: WO2024/259827
PCT Pub. Date: Dec. 26, 2024

(65) Prior Publication Data
US 2025/0391514 A1 Dec. 25, 2025

(30) Foreign Application Priority Data
Jun. 21, 2023 (CN) .......................... 202310738491.9

(51) Int. Cl.
*G16C 20/30* (2019.01)
*G01N 21/31* (2006.01)
(Continued)

(52) U.S. Cl.
CPC ........... *G16C 20/30* (2019.02); *G01N 21/359* (2013.01); *G01N 33/24* (2013.01); *G06N 20/20* (2019.01);
(Continued)

(58) Field of Classification Search
CPC ...... G16C 20/30; G16C 20/70; G01N 21/359; G01N 33/24; G01N 2021/3155; G01N 2201/129; G06N 20/20
See application file for complete search history.

(56) References Cited

U.S. PATENT DOCUMENTS

2013/0046469 A1* 2/2013 Herron ............... G01N 21/3563
702/2
2018/0188225 A1* 7/2018 Viscarra Rossel ....... G01N 1/08

FOREIGN PATENT DOCUMENTS

CN 115392120 A * 11/2022 ......... G01N 21/3563
WO WO-2020073737 A1 * 4/2020 ........... G01N 21/359

OTHER PUBLICATIONS

CN-115392120-A_translated (Year: 2022).*
(Continued)

*Primary Examiner* — Lisa M Caputo
*Assistant Examiner* — Michael J Singletary
(74) *Attorney, Agent, or Firm* — Jiwen Chen; Joywin IP Law PLLC

(57) ABSTRACT

Disclosed is a method and device for predicting soil organic carbon based on spectrum-guided ensemble learning. The method includes: obtaining a soil sample and a real organic carbon content and an original soil spectrum thereof, preprocessing the original soil spectrum to obtain a soil spectrum sample, constructing, based on the soil spectrum sample, a sample set, grouping the sample set into a first training set and a validation set, and using the real organic carbon content as a label; training, based on the first training set and the corresponding labels, a partial least squares regression model, a Cubist model and a random forest model to obtain carbon content predicted value sets of the three models; constructing, based on the carbon content predicted value sets of the three models and soil spectrum principal component data, a second training set, and training a second random forest model with the second training set and corresponding labels to obtain a spectrum-guided ensemble model. The method combines the advantages of different predictive models and can accurately predict the soil carbon content.

10 Claims, 1 Drawing Sheet

(51) Int. Cl.
*G01N 21/359* (2014.01)
*G01N 33/24* (2006.01)
*G06N 20/20* (2019.01)
*G16C 20/70* (2019.01)

(52) U.S. Cl.
CPC ..... *G16C 20/70* (2019.02); *G01N 2021/3155* (2013.01); *G01N 2201/129* (2013.01)

(56) References Cited

OTHER PUBLICATIONS

WO-2020073737-A1_translated (Year: 2020).*
Zhu, Jianwei et al. "Study on near-infrared spectroscopy model of soil organic carbon after biochar addition and its application", Oct. 31, 2020.

* cited by examiner

METHOD AND DEVICE FOR SPECTRAL PREDICTION OF SOIL ORGANIC CARBON BASED ON SPECTRUM-GUIDED ENSEMBLE LEARNING

This is a U.S. national stage application of PCT Application No. PCT/CN2023/124837 under 35 U.S.C. 371, filed Oct. 17, 2023 in Chinese, claiming priority of Chinese Application No. 202310738491.9, Jun. 21, 2023, all of which are hereby incorporated by reference.

FIELD OF TECHNOLOGY

The present invention belongs to soil property prediction methods, and in particular to a method and device for spectral prediction of soil organic carbon based on spectrum-guided ensemble learning.

BACKGROUND TECHNOLOGY

As the earth's skin, soil provides a lot of ecosystem services and functions to enable the life on the earth to survive. Soil Organic Carbon (SOC) is a key component of soil organic matter and an important indicator of soil fertility. Estimation of soil organic carbon is conducive to rational fertilization of land, and has important significance for increasing crop yield, improving soil quality and protecting soil ecological environment.

Soil organic carbon pool accounts for more than 70% of terrestrial ecosystem carbon pool, and the total amount of the organic carbon stored in soil exceeds the sum of atmospheric and vegetation carbon pools. Therefore, the slight changes of the soil organic carbon pool will have great impact on the global carbon cycle. Considering the importance of soil organic carbon to food security and climate change, it is necessary to monitor the dynamic changes of soil organic carbon in a timely manner.

As soil organic carbon determination based on traditional laboratory physical and chemical analysis has the disadvantages of long cycle, high cost and possible use of environmentally harmful reagents, traditional soil organic carbon measurements are based on field sampling and laboratory chemical determination. Field sampling itself needs high human resource cost and is easily limited by weather and terrain, it is time-consuming and costly to accurately estimate soil organic carbon in a large area, and the sampling personnel are in life risk. In addition, potassium dichromate and other heavy metal-containing chemical reagents are often used in the determination process, which is easy to cause environmental pollution or leads to reagent disposal costs.

The methods for determining soil organic carbon based on spectroscopy technologies are being developed. Compared with mid-infrared spectroscopy, soil visible-near infrared spectroscopy has the advantages of low cost, high portability and less external interference, and is most widely used in soil organic carbon determination.

A soil spectral predictive model is the most important step to predict soil organic carbon content using soil spectroscopy technology. The predictive model will directly determine whether the prediction results are reliable. The soil spectral predictive model is continuously advanced from the previous linear models such as multiple linear regression and partial least squares regression to the nonlinear models such as machine learning and deep learning. Due to the difference of model structures, the applicability of single predictive model to various data is different and the model stability is limited.

Therefore, it is urgent to design a predictive model of soil organic carbon based on ensemble learning, which can make full use of the advantages of different predictive models and characterize the scope of application of different predictive models by spectrum guidance.

SUMMARY OF INVENTION

The present invention provides a method for spectral prediction of soil organic carbon based on spectrum-guided ensemble learning, which combines the advantages of different predictive models and can accurately predict soil organic carbon content.

Particular embodiments of the present invention provide a method for predicting soil organic carbon based on spectrum-guided ensemble learning, which includes:
   obtaining a plurality of soil samples, obtaining an organic carbon content measurement and an original soil spectrum from each soil sample, pre-processing each original soil spectrum to obtain a soil spectrum sample, performing principal component analysis on the soil spectrum sample to obtain soil spectrum principal component data, constructing a sample set based on the soil spectrum sample, grouping all the sample set into a first training set and a validation set, and using the organic carbon content measurement as a label;
   single model training, based on the first training set and the corresponding labels, a partial least squares regression model, a Cubist model and a random forest model, and inputting a plurality of soil spectrum samples into a trained least squares regression model, a Cubist model and a first random forest model to respectively obtain carbon content prediction sets of the three models;
   constructing, based on the carbon content prediction sets of the three models and the soil spectrum principal component data, a second training set, and training a second random forest model with the second training set and corresponding labels to obtain a spectrum-guided ensemble model;
   during application, the soil spectrum samples are input into the spectrum-guided ensemble model to obtain a predicted soil organic carbon content.

Further, obtaining a spectrum-guided ensemble model through training a second random forest model with the second training set and corresponding labels includes:
   determining, based on the second training set, the number of optimal trees and the number of branch variables of the second random forest by 10-fold cross-validation, and performing fitting, based on the determined number of optimal trees and number of branch variables, to obtain the spectrum-guided ensemble model.

Further, obtaining an organic carbon content measurement and an original soil spectrum corresponding to each soil sample includes:
   air drying, grinding and sieving each soil sample to obtain a pre-processed soil, and analyzing the pre-processed soil to obtain the organic carbon content measurement of each soil sample; and
   measuring spectral data of each pre-processed soil by a visible-near infrared spectrometer to obtain the original soil spectrum.

Further, the pre-processing each original soil spectrum to obtain a soil spectrum sample includes:

removing a waveband of the original soil spectrum with a relatively loud noise, and performing smooth denoising and signal enhancement processing on the retained waveband of the original soil spectrum, wherein the waveband of the relatively loud noise is 400-500 nm, and the retained waveband of the original soil spectrum is 500-2500 nm.

Further, training, based on the first sample set and the corresponding labels, a partial least squares regression model includes:

determining, based on the first sample set, the number of optimal latent variables in the partial least squares regression model is by 10-fold cross-validation, and performing fitting, based on the number of optimal latent variables, to obtain the trained least squares regression model.

Further, training, based on the first sample set and corresponding labels, the Cubist model includes:

determining, based on the first sample set, the number of optimal member trees in the Cubist model by 10-fold cross-validation, and performing fitting, based on the number of optimal member trees, to obtain the trained Cubist model.

Further, training, based on a first sample set and a corresponding label, a first random forest model includes:

determining, based on the first sample set, the number of optimal trees and the number of branch variables in the first random forest model by 10-fold cross-validation, and performing fitting, based on the number of optimal trees and the number of branch variables, to obtain the trained first random forest model.

Further, the validation set is input into the spectrum-guided ensemble model to obtain a soil organic carbon prediction set, the prediction accuracy is obtained by a determination coefficient or root mean squared error based on the soil organic carbon prediction value and the corresponding label, and when the prediction accuracy reaches an accuracy threshold, the validation of the second random forest is completed to obtain the final spectrum-guided ensemble model.

Further, based on the soil organic carbon prediction value and the corresponding label, the prediction accuracy $R^2$ obtained by the determination coefficient is:

$$R^2 = 1 - \frac{\sum_i^n (y_i - \hat{y}_i)^2}{\sum_i^n (y_i - \bar{y})^2}$$

wherein n is the number of soil spectrum samples in the validation set, $y_i$ is a label corresponding to the $i^{th}$ soil spectrum sample, and $\hat{y}_i$ is a predicted soil organic carbon value of the $i^{th}$ soil spectrum sample;

or a prediction accuracy RMSE is obtained by a root mean squared error based on the soil organic carbon prediction value and the corresponding label as follows:

$$RMSE = \sqrt{\frac{1}{n}\sum_{i=1}^n (y_i - \hat{y}_i)^2}$$

wherein n is the number of soil spectrum samples in the validation set, $y_i$ is a label corresponding to the $i^{th}$ soil spectrum sample, and $\hat{y}_i$ is a predicted soil organic carbon value of the $i^{th}$ soil spectrum sample.

The present invention also provides a device for spectral prediction of soil organic carbon based on spectrum-guided ensemble learning, which includes a computer memory, a computer processor, and a computer program stored in the computer memory and executable on the computer processor, wherein a spectrum-guided ensemble model constructed by the method for spectral prediction of soil organic carbon based on spectrum-guided ensemble learning is used in the computer memory;

the computer processor implements the following steps when executing the computer program:

inputting the soil spectrum into the spectrum-guided ensemble model to obtain a predicted soil organic carbon content.

Compared with the prior art, the advantageous effects of the present invention are:

In the present invention, after constructing three predictive models based on soil spectral data and soil organic carbon content measurement training, the carbon content predicted value sets output by the three predictive models with the principal component data of the soil spectrum as a training set to fit a second random forest model to obtain a spectrum-guided ensemble learning model, so that a more accurate part of the mapping between the spectrum principal component and the soil carbon content in each predictive model can be retained, thereby retaining and combining a waveband in which the prediction of the soil carbon content in each model is accurate, thereby enabling a more accurate prediction of the soil carbon content, the method is more cost-effective and more efficient than the prior art method of obtaining soil organic carbon content by laboratory physical and chemical methods, and the prior art method of obtaining soil organic carbon content by single soil spectral predictive model is more accurate.

DESCRIPTION OF THE EMBODIMENTS

In order that the objects, aspects and advantages of the present invention will become more apparent, a more particular description of the invention will be rendered by reference to the appended drawings. According to the present embodiment, soil organic carbon content and soil visible-near infrared spectrum of different soil samples from a European land cover and utilization classification map are selected for modeling to finally obtain a soil organic carbon predictive model.

Figure 1:
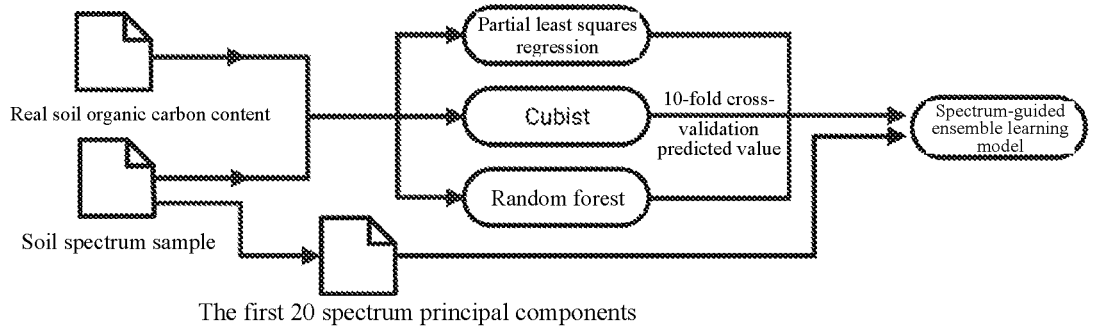
FIG. 1 is a block diagram of a method for predicting soil organic carbon based on spectrum-guided ensemble learning according to an embodiment of the present invention.
Figure 2:
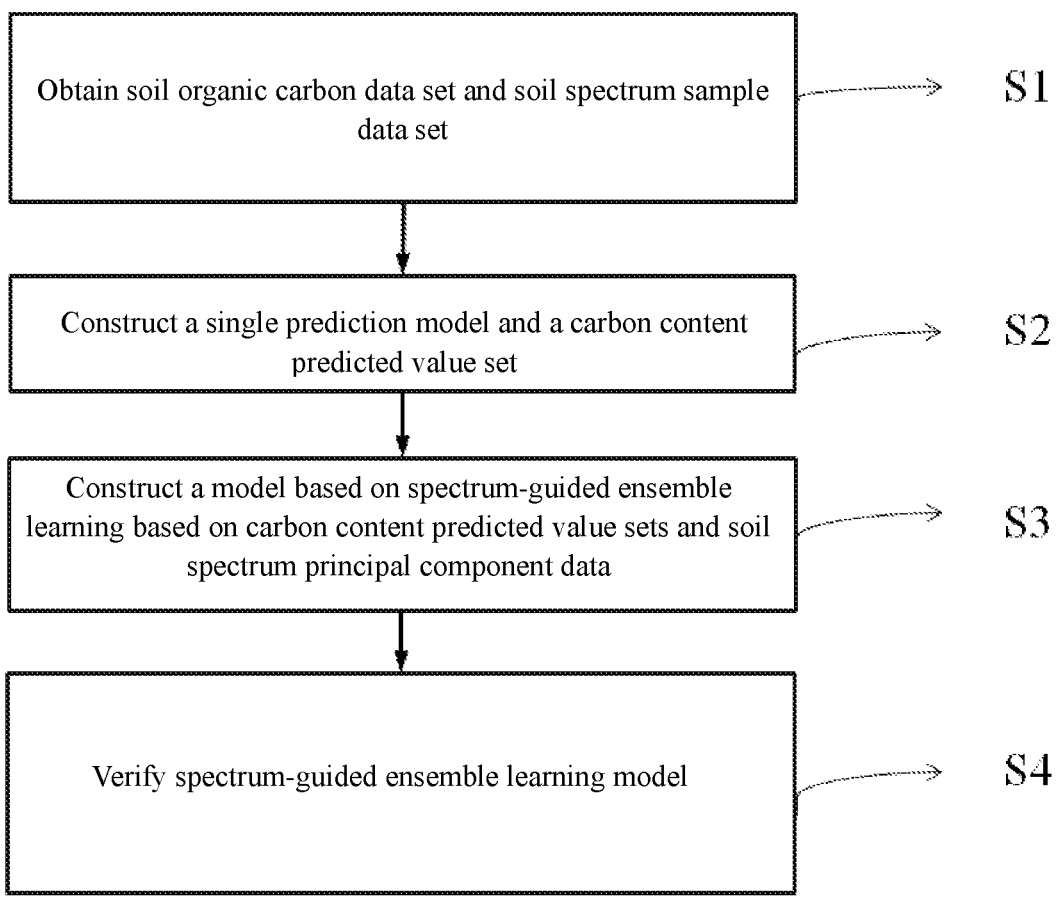
FIG. 2 is a flow chart of a method for predicting soil organic carbon based on spectrum-guided ensemble learning according to an embodiment of the present invention.

Since there are differences in the characteristic spectra used by a single predictive model in the prior art, each model has a different preferable prediction interval, the overall prediction accuracy of the single predictive model is not high. According to particular embodiments of the present invention, a new random forest model is trained by using the prediction results of a single soil carbon content predictive model and a soil spectrum principal component as a training set, and the preferable prediction intervals of different single predictive models are explored by means of spectrum guidance so as to more accurately predict the soil carbon content; and particular embodiments of the present invention provide a method for predicting soil organic carbon based on spectrum-guided ensemble learning, as shown in FIGS. 1 and 2, the specific steps are as follows:

(1) soil organic carbon data set and soil spectrum sample data set are obtained:

according to particular embodiments of the present invention, a soil organic carbon data set is obtained, which includes: a total of 18000 soil samples were collected from farmland, woodland and grassland in Europe according to the land use and land cover classification map. The soil samples were air-dried, grinded and sieved to obtain pre-processed soil which was then subjected to laboratory physical and chemical analysis to obtain organic carbon content measurements of the soil samples to form a soil organic carbon data set. The soil sampling depth is 0-20 cm, and the organic carbon content measurement of the soil is determined by an element analyzer.

According to the particular embodiments of the present invention, obtaining a soil spectrum sample data set includes: the spectral data of each screened pre-processed soil was determined by a visible-near infrared spectrometer, and the original soil spectrum of the sample was obtained by averaging the three repeated spectra of each pre-processed soil; FOSS XDS Rapid Content Analyser spectrometer was selected as the visible-near infrared spectrometer, its spectral wavelength range was 400-2500 nm, and the spectral sampling interval was 0.5 nm; after each determination of 10 spectra, the spectrometer needs to be subject to the white calibration; the 400-500 nm band with loud noise in the initial spectrum was removed, and the spectral data retained was 500-2450 nm band; the Savitzky-Golay method based on the second-order polynomial 101 window number was used to smooth the original soil spectrum and enhance the characteristics of the spectrum signal to obtain the soil spectrum samples, and the first 20 principal component data were selected by principal component analysis to obtain the soil spectrum principal component data.

(2) a single predictive model and a carbon content predicted value set are constructed:

S1: a sample set was constructed based on the soil spectrum samples and was grouped into a first training set and a validation set; the organic carbon content measurement was used as a label, 75% of the data in the sample set was grouped into the first training set and the remaining 25% of the data was grouped into the validation set by random sampling. According to the present embodiment, the first training set contained 13500 soil spectrum samples and the validation set contained 4500 soil spectrum samples.

S2: a partial least squares regression model, a Cubist model and a random forest model were respectively trained based on the first training set and the corresponding labels to obtain three single predictive models, and a plurality of soil spectrum samples were input into the trained least squares regression model, the Cubist model and the first random forest model to respectively obtain the carbon content predicted value sets of the three models to preliminarily acquire the prediction results of soil organic carbon.

In a particular embodiment, the number of optimal latent variables in the partial least squares regression model is determined by 10-fold cross-validation, and a 10-fold cross-validation predicted value of each modeling set sample is obtained by fitting the partial least squares regression model based on the number of optimal latent variables. According to the present embodiment, the number of optimal latent variables for the partial least squares regression model is 19.

In a particular embodiment, the number of optimal member trees in the Cubist model is determined by 10-fold cross-validation, and a 10-fold cross-validation prediction value of each modeling set sample is obtained by fitting the Cubist model based on the number of optimal member trees. According to the present embodiment, the number of optimal member trees of the Cubist model is optimized as 5.

In a particular embodiment, the number of optimal trees and the number of branch variables in the first random forest model are determined by 10-fold cross-validation, and a 10-fold cross-validation predicted value of each modeling set sample is obtained by fitting the random forest model based on the number of optimal trees and the number of branch variables. According to the present embodiment, the number of optimal trees and the number of branch variables of the random forest model are respectively optimized as 300 and 8.

(3) A model based on spectrum-guided ensemble learning is constructed based on carbon content prediction value sets and soil spectrum principal component data:

S3: a second training set was constructed based on the carbon content predicted value sets of the three models and the soil spectrum principal component data, and a second random forest model was trained with a second training set and corresponding labels to obtain a spectrum-guided ensemble model.

In a particular embodiment, the number of optimal trees and the number of branch variables of the second random forest are determined by 10-fold cross-validation, and the second random forest model is fitted based on the number of optimal trees and the number of branch variables to obtain the spectrum-guided ensemble model. According to the present embodiment, the number of optimal trees of the second random forest is optimized as 500, and the number of branch variables is optimized as 5.

(4) A spectrum-guided ensemble learning model is validated: the prediction accuracy of the spectrum-guided ensemble learning model was evaluated by comparing the established spectrum-guided ensemble learning model prediction validation set with the soil organic carbon measurement and soil organic carbon prediction of the soil samples in the validation set; when the prediction accuracy reaches an standard, the established spectrum-guided ensemble learning model can be used to predict soil organic carbon.

In a particular embodiment, the validation set is input into the spectrum-guided ensemble model to obtain a soil organic carbon prediction value set, the prediction accuracy is obtained by a determination coefficient or root mean squared error based on the soil organic carbon prediction value and the corresponding label, and when the prediction accuracy reaches an accuracy threshold, the validation of the second random forest is completed to obtain the final spectrum-guided ensemble model.

According to the present embodiment, the prediction accuracy of the validation set is evaluated by the determination coefficient ($R^2$) or the root mean squared error (RMSE). The accuracy evaluation results of the spectrum-guided ensemble learning model and the three single models are as shown in Table 1. It can be seen from Table 1 that the validation set of the spectrum-guided ensemble learning model has an $R^2$ of 0.76 and a RMSE of 9.55 g kg$^{-1}$, which is far superior to the single partial least squares regression, Cubist and random forest models and has a good prediction accuracy.

$R^2$ provided by the particular embodiments of the present invention provide is:

$$R^2 = 1 - \frac{\sum_i^n (y_i - \hat{y}_i)^2}{\sum_i^n (y_i - \bar{y})^2}$$

RMSE provided by the particular embodiments of the present invention is:

$$RMSE = \sqrt{\frac{1}{n}\sum_{i=1}^{n}(y_i - \hat{y}_i)^2}$$

wherein n is the number of soil spectrum samples in the validation set, $y_i$ is a soil organic carbon measurement corresponding to the $i^{th}$ soil spectrum sample, and $\hat{y}_i$ is a soil organic carbon prediction value of the $i^{th}$ soil spectrum sample;

TABLE 1

Comparison of prediction accuracy of different models based on validation set

| Model | Root mean squared error (g kg$^{-1}$) | Determination coefficient |
|---|---|---|
| Partial least squares regression | 11.41 | 0.65 |
| Cubist | 13.19 | 0.54 |
| Random forest | 11.04 | 0.68 |
| Spectrum-guided ensemble learning | 9.55 | 0.76 |

In application, the visible-near infrared spectrometer of the soil sample to be detected is input into the final spectrum-guided ensemble learning model to the predicted soil organic carbon content.

The present invention also provides a device for spectral prediction of soil organic carbon based on spectrum-guided ensemble learning, which includes a computer memory, a computer processor, and a computer program stored in the computer memory and executable on the computer processor, wherein a spectrum-guided ensemble model constructed by the method for spectral prediction of soil organic carbon based on spectrum-guided ensemble learning is used in the computer memory.

The present invention also provides a computer processor which implements the following steps when executing the computer program:

inputting a soil spectrum into the spectrum-guided ensemble model to obtain a predicted soil organic carbon content.

The spectrum-guided ensemble learning model provided by the present invention can quickly and accurately predict the soil organic carbon content according to the visible-near infrared spectral data of soil, greatly improve the acquisition efficiency while reducing the cost of soil information acquisition, and provide a new idea for soil information acquisition of low-cost, high-efficiency, high-precision, large-scale soil resource survey and ecological environment modeling.

According to the present invention, a single model predicted value, a mapping relationship between the spectrum principal component and the soil organic carbon content are constructed by the final spectrum-guided ensemble learning model, and thus the soil organic carbon content is obtained by the final spectrum-guided ensemble learning model constructed by the present invention based on the soil visible-near infrared data, thereby improving the ability to rapidly, efficiently and accurately predict the soil organic carbon content by the soil spectroscopy technology.

What is claimed is:

1. A method for predicting soil organic carbon based on spectrum-guided ensemble learning, comprising:

obtaining plurality of soil samples, obtaining a organic carbon content measurement and an original soil spectrum from each soil sample, pre-processing each original soil spectrum to obtain a soil spectrum sample, performing principal component analysis on the soil spectrum sample to obtain soil spectrum principal component data, constructing, based on the soil spectrum sample, a sample set, grouping the sample set into a first training set and a validation set, and using the organic carbon content measurement as a label;

respectively training, based on the first training set and the corresponding labels, a partial least squares regression model, a Cubist model and a random forest model, and inputting a plurality of soil spectrum samples into a trained least squares regression model, a trained Cubist model and a trained first random forest model to respectively obtain carbon content predicted value sets of the three models;

constructing a second training set based on the carbon content predicted value sets of the three models and the soil spectrum principal component data, and training a second random forest model with the second training set and corresponding labels to obtain a spectrum-guided ensemble model;

during application, inputting the soil spectrum samples into the spectrum-guided ensemble model to obtain a predicted soil organic carbon content.

2. The method for predicting soil organic carbon based on spectrum-guided ensemble learning according to claim 1, wherein obtaining a spectrum-guided ensemble model through training a second random forest model with the second training set and corresponding labels comprises:

based on the second training set, determining the number of optimal trees and the number of branch variables of the second random forest by 10-fold cross-validation, and performing fitting, based on the determined number of optimal trees and number of branch variables, to obtain the spectrum-guided ensemble model.

3. The method for predicting soil organic carbon based on spectrum-guided ensemble learning according to claim 1, wherein obtaining an organic carbon content measurement and an original soil spectrum corresponding to each soil sample comprises:

air drying, grinding and sieving each soil sample to obtain a pre-processed soil, and analyzing the pre-processed soil to obtain the organic carbon content measurement of each soil sample; and measuring spectral data of each pre-processed soil by a visible-near infrared spectrometer to obtain the original soil spectrum.

4. The method for predicting soil organic carbon based on spectrum-guided ensemble learning according to claim 1, wherein the pre-processing each original soil spectrum to obtain a soil spectrum sample comprises:

removing a waveband of the original soil spectrum with a relatively loud noise, and performing smooth denoising and signal enhancement processing on the retained waveband of the original soil spectrum, wherein the waveband of the relatively loud noise is 400-500 nm, and the retained waveband of the original soil spectrum is 500-2450 nm.

5. The method for predicting soil organic carbon based on spectrum-guided ensemble learning according to claim 1, wherein training, based on the first sample set and the corresponding labels, a partial least squares regression model comprises:
determining, based on the first sample set, the number of optimal latent variables in the partial least squares regression model is by 10-fold cross-validation, and performing fitting, based on the number of optimal latent variables, to obtain the trained least squares regression model.

6. The method for predicting soil organic carbon based on spectrum-guided ensemble learning according to claim 1, wherein training, based on the first sample set and the corresponding labels, a Cubist model comprises:
determining, based on the first sample set, the number of optimal member trees in the Cubist model by 10-fold cross-validation, and performing fitting, based on the number of optimal member trees, to obtain the trained Cubist model.

7. The method for predicting soil organic carbon based on spectrum-guided ensemble learning according to claim 1, wherein training, based on the first sample set and the corresponding labels, a first random forest model comprises:
determining, based on the first sample set, the number of optimal trees and the number of branch variables in the first random forest model by 10-fold cross-validation, and performing fitting, based on the number of optimal trees and the number of branch variables, to obtain the trained first random forest model.

8. The method for predicting soil organic carbon based on spectrum-guided ensemble learning according to claim 1, wherein the validation set is input into the spectrum-guided ensemble model to obtain a soil organic carbon predicted value set, prediction accuracy is obtained by a determination coefficient or root mean squared error based on the soil organic carbon predicted value and the corresponding label, and when the prediction accuracy reaches an accuracy threshold, the validation of the second random forest is completed to obtain the final spectrum-guided ensemble model.

9. The method for predicting soil organic carbon based on spectrum-guided ensemble learning according to claim 8, wherein a prediction accuracy $R^2$ obtained by a determination coefficient based on the soil organic carbon predicted value and the corresponding label is:

$$R^2 = 1 - \frac{\sum_i^n (y_i - \hat{y}_i)^2}{\sum_i^n (y_i - \bar{y})^2}$$

wherein n is the number of soil spectrum samples in the validation set, $y_i$ is a label corresponding to the $i^{th}$ soil spectrum sample, and $\hat{y}_i$ is a soil organic carbon predicted value of the $i^{th}$ soil spectrum sample;

or a prediction accuracy RMSE is obtained by a root mean squared error based on the soil organic carbon predicted value and the corresponding label as follows:

$$RMSE = \sqrt{\frac{1}{n}\sum_{i=1}^{n}(y_i - \hat{y}_i)^2}$$

wherein n is the number of soil spectrum samples in the validation set, $y_i$ is a label corresponding to the $i^{th}$ soil spectrum sample, and $\hat{y}_i$ is a soil organic carbon predicted value of the $i^{th}$ soil spectrum sample.

10. A device for predicting soil organic carbon based on spectrum-guided ensemble learning, comprising a computer memory, a computer processor, and a computer program stored in the computer memory and executable on the computer processor, wherein a spectrum-guided ensemble model constructed by the method for spectral prediction of soil organic carbon based on spectrum-guided ensemble learning according to claim 1 is used in the computer memory;
the computer processor implements the following steps when executing the computer program:
inputting a soil spectrum into the spectrum-guided ensemble model to obtain a predicted soil organic carbon content.

\* \* \* \* \*